(12) United States Patent
Hucker et al.

(10) Patent No.: US 8,534,133 B2
(45) Date of Patent: Sep. 17, 2013

(54) ELECTRICAL CIRCUIT ASSEMBLIES AND STRUCTURAL COMPONENTS INCORPORATING SAME

(75) Inventors: Martyn John Hucker, North Somerset (GB); Sajad Haq, Glasgow (GB); Michael Dunleavy, Bristol (GB); David William Gough, Bristol (GB); Jason Karl Rew, Bristol (GB); Philip Lawrence Webberley, Preston (GB)

(73) Assignee: BAE Systems PLC, London (GB)

( * ) Notice: Subject to any disclaimer, the term of this patent is extended or adjusted under 35 U.S.C. 154(b) by 298 days.

(21) Appl. No.: 13/003,145

(22) PCT Filed: Jul. 7, 2009

(86) PCT No.: PCT/GB2009/050800
§ 371 (c)(1),
(2), (4) Date: Jan. 7, 2011

(87) PCT Pub. No.: WO2010/004324
PCT Pub. Date: Jan. 14, 2010

(65) Prior Publication Data
US 2011/0107843 A1    May 12, 2011

(30) Foreign Application Priority Data
Jul. 8, 2008 (GB) .................................. 0812483.6

(51) Int. Cl.
*G01B 7/16* (2006.01)
(52) U.S. Cl.
USPC ............................................. 73/777; 73/760
(58) Field of Classification Search
USPC .................................................. 73/760, 777
See application file for complete search history.

(56) References Cited

U.S. PATENT DOCUMENTS

| 3,331,758 A | 7/1967 | Levine |
| 5,372,133 A | 12/1994 | Hogen Esch |
| 5,843,567 A | 12/1998 | Swift et al. |

(Continued)

FOREIGN PATENT DOCUMENTS

| DE | 102004042423 A1 | 3/2006 |
| GB | 2 180 940 A | 4/1987 |

(Continued)

OTHER PUBLICATIONS

Notification of Transmittal of the International Search Report (Forms PCT/ISA/220 and PCT/ISA/210) and the Written Opinion of the international Searching Authority (Form PCT/ISA/237) issued on Oct. 6, 2009, in the International Application No. PCT/GB2009/050799.

(Continued)

*Primary Examiner* — Max Noori
(74) *Attorney, Agent, or Firm* — Buchanan Ingersoll & Rooney PC

(57) ABSTRACT

A structural health monitoring arrangement includes a component formed of fiber reinforced composite material with a plurality of electrical conducting fibers intrinsic to the composite defining electrical paths that run through the composite. The paths act as sensing paths running through the material and a detector watches for changes in electrical property indicative of a structural event. The paths may be configured as an open or a closed node grid whose electrical continuity is monitored directly or indirectly. Alternatively they may be fibers having a piezoresistive property and the changes in resistance may be monitored.

15 Claims, 6 Drawing Sheets

(56) References Cited

U.S. PATENT DOCUMENTS

| | | | |
|---|---|---|---|
| 7,018,217 B2 * | 3/2006 | Marshall et al. | 439/67 |
| 7,924,031 B2 * | 4/2011 | Watkins et al. | 324/693 |
| 2003/0219059 A1 | 11/2003 | Scott | |
| 2005/0260870 A1 | 11/2005 | Marshall et al. | |
| 2007/0096751 A1 * | 5/2007 | Georgeson et al. | 324/691 |
| 2007/0148345 A1 | 6/2007 | Decams et al. | |
| 2008/0026187 A1 * | 1/2008 | Hauer | 428/188 |
| 2008/0115954 A1 | 5/2008 | Gries | |
| 2009/0121121 A1 | 5/2009 | Dunleavy et al. | |
| 2009/0294022 A1 | 12/2009 | Hayes et al. | |
| 2011/0017867 A1 | 1/2011 | Simmons et al. | |

FOREIGN PATENT DOCUMENTS

| | | |
|---|---|---|
| GB | 2 218 813 A | 11/1989 |
| GB | 2 421 952 A | 7/2006 |
| JP | 5-332965 A | 12/1993 |
| WO | WO 2005/114781 A2 | 12/2005 |
| WO | WO 2007/003880 A1 | 1/2007 |
| WO | WO 2007/003883 A1 | 1/2007 |

OTHER PUBLICATIONS

Notification Concerning Transmittal of International Preliminary Report on Patentability (Forms PCT/IB/326 and PCT/IB/373) and the Written Opinion of the Searching Authority ( Form PCT/ISA/237) issued in the corresponding International Application No. PCT/GB2009/050800 dated Jan. 20, 2011.

International Search Report (PCT/ISA/210) issued on Nov. 9, 2009, by United Kingdom Patent Office as the International Searching Authority for International Application No. PCT/GB2009/050800.

United Kingdom Search Report (2) issued on Jun. 30, 2009.

Ruediger Schueler et al., "Conductivity of CFRP as a Tool for Health and Usage Monitoring", Proceedings of the SPIE, vol. 3041, Jan. 1, 1997, pp. 417-426, XP-007910306.

I. Hou et al., "A Resistance-Based Damage Location Sensor for Carbon-Fibre Composites", Smart Material and Structures, vol. 11, No. 6, Dec. 1, 2002, pp. 966-969, XP-020071702.

Takeyasu et al. "Metal Deposition Into Deep Microstructure by Electroless Plating", *Japanese Journal of Applied Physics*, vol. 44, No. 35, 2005, pp. 1134-1137.

Office Action dated Mar. 15, 2013 issued by the USPTO in corresponding U.S. Appl. No. 13/003,174.

* cited by examiner

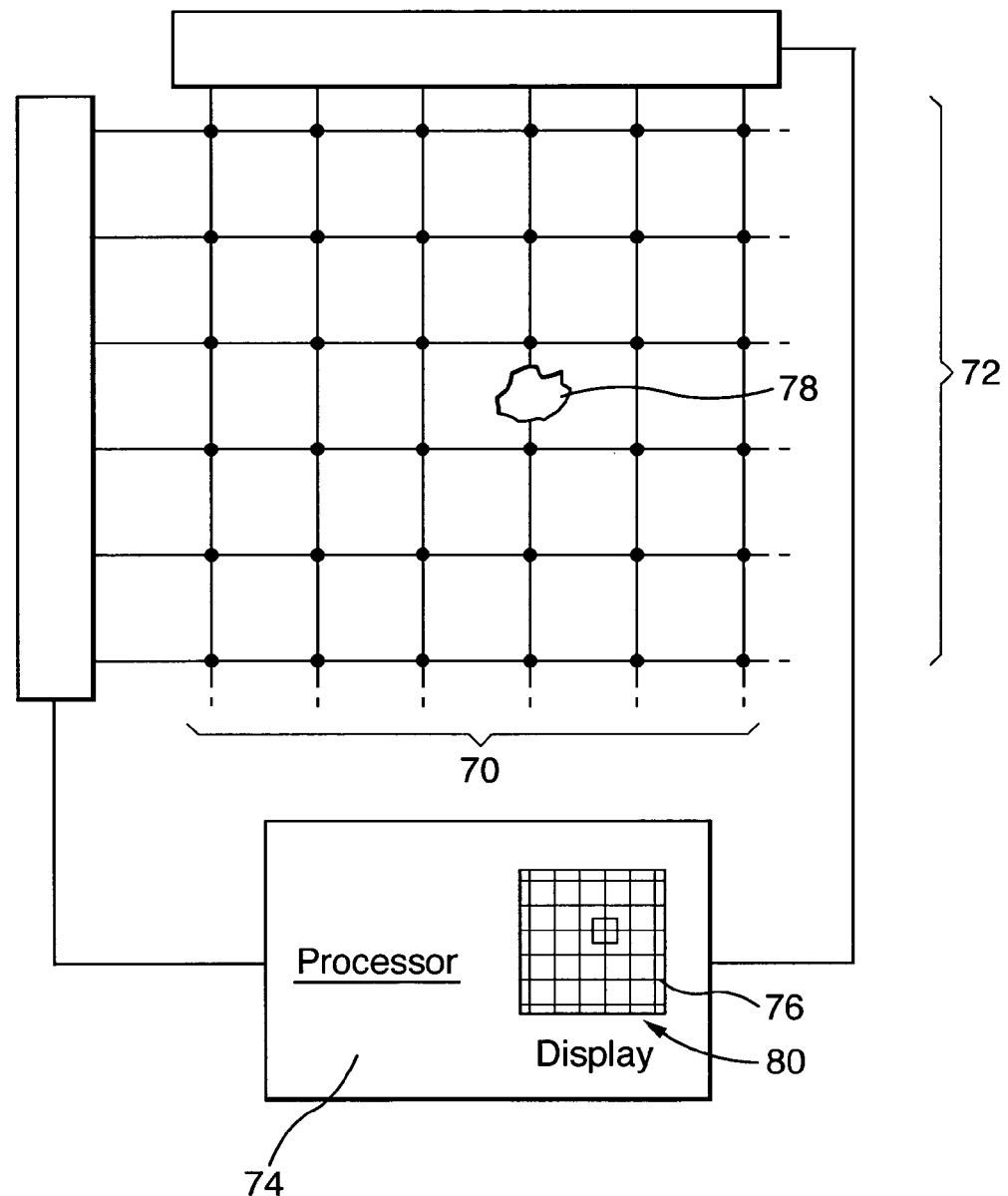

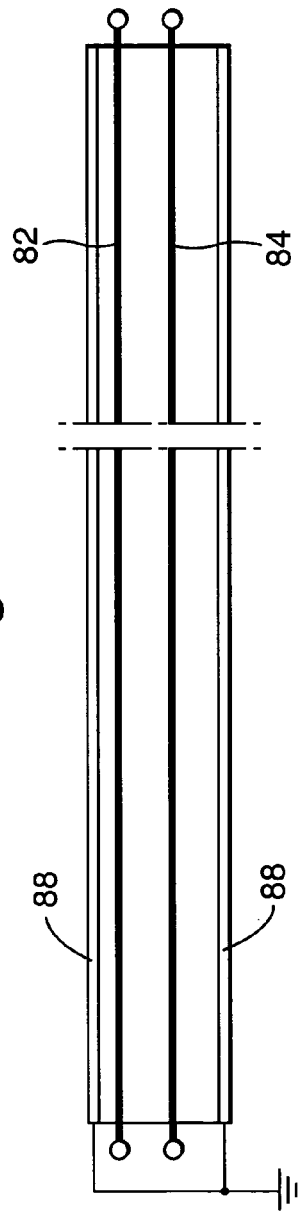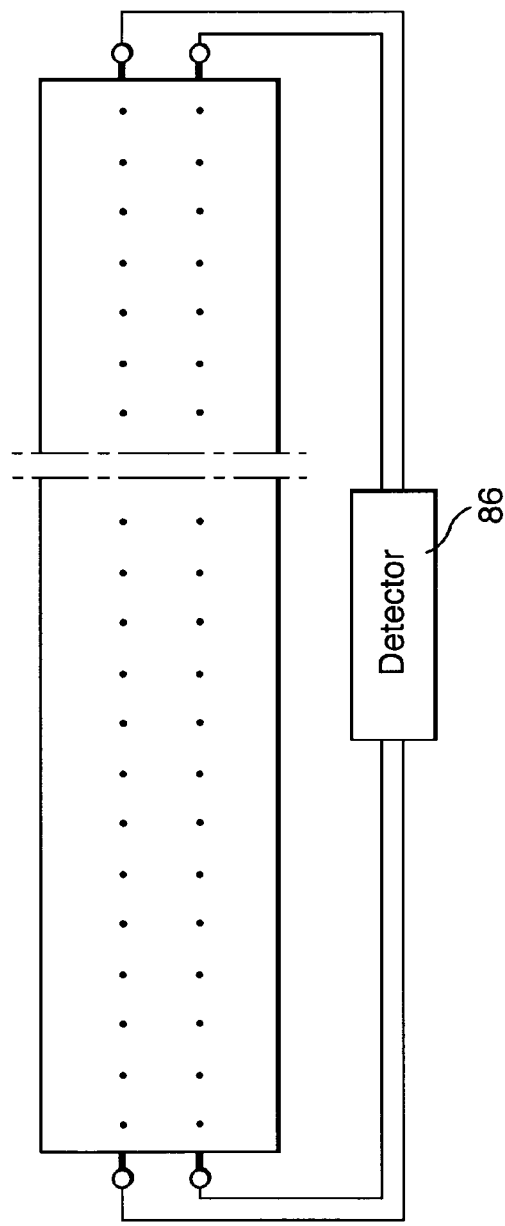
Fig.7a.
Fig.7b.

ELECTRICAL CIRCUIT ASSEMBLIES AND STRUCTURAL COMPONENTS INCORPORATING SAME

This invention relates to electrical circuit assemblies and structural components incorporating the same, and in particular but not exclusively to structural health monitoring arrangements.

With the increased use of composite materials in many applications such as aircraft, and other vehicles, and the development of intelligent structures, a need exists for arrangements to monitor the structural health of composite materials. The term 'structural health' is used to mean the health of the material in terms of extraneous damage caused by the impact by objects, erosion etc as well as internal damage such as stress-induced cracking, delamination and also simply the measurement of the local stresses and strains to which the composite is subjected. In an aircraft, for example, the navigation system may have an inertial platform that will determine and report the accelerations to which the airframe has been subject, but it will not report on the magnitude of local stresses and strains.

Accordingly, we have developed a composite material that incorporates a structural health monitoring facility.

In one aspect a structural health monitoring arrangement comprising a component formed of a fibre reinforced composite material including a plurality of electrically conducting fibres defining electrical paths running through said composite material, and a detector for monitoring an electrical characteristic of one or more of said paths, thereby to determine a structural condition of said component.

In preferred arrangements, the electrically conducting fibres may be intrinsic to the structure as reinforcing fibres so that they perform a dual function and do not significantly compromise the structure integrity of the component.

In order to provide location information, said paths may be arranged in groups in respective co-ordinate directions. Thus, for example, said groups may extend in orthogonal linear directions in a two-dimensional array to allow detection in X and Y directions. Where depth information is required said groups may be layered in a third orthogonal direction thereby to allow detection in a third Z direction.

In each of these arrangements a grid is defined over an area or component to be monitored, and we provide two types of grid configuration. In an open node network the electrical paths are not in electrical contact at the nodes or crossings of said co-ordinate directions. In a closed node network the electrical paths are in electrical contact at the nodes of said co-ordinate directions thereby to provide a closed node network.

In an open node network the detector may monitor the continuity of one or more selected paths and thereby determine the co-ordinates of an event causing a break in continuity of one or more of said paths. In a closed node network the detector may monitor the network resistance between selected paths across the network thereby to deduce the location of an event causing a detectable change in resistance. In this type of set-up, the detector may monitor at spaced intervals to collect data pertaining to said paths, and determine if the changes in said data exceed a threshold value at one or more locations.

In another arrangement the electrically conducting fibres are selected to be piezoresistive, whereby the resistance of a given fibre varies in accordance with the applied strain.

Although simple compressive and tensile loading can be measured, in preferred arrangements selected paths are spaced from a neutral bending axis of the component, thereby to allow detection of bending of the component. Likewise, suitable fibre arrangements may be designed to measure torsion. In one arrangement two groups of electrically conducting paths may be spaced one to either side of the neutral bending axis with the detector monitoring the change of resistance of each group and thereby classifying any strains in terms of a tensile load, a compressive load, bending in a first sense or bending in a second, opposite sense.

The component may include an electrical screening element disposed adjacent at least one external surface of said component, and said electrical screening element may be connected to respective ends of one or more of said electrical paths, thereby serving as a ground, or return path.

In another aspect this invention provides a structural health monitoring arrangement comprising a component formed of a fibre reinforced composite material including a plurality of elongate conductors of a piezoresistive material running through said composite, and a detector for monitoring the resistance of one or more of said elongate conductors thereby to determine a structural condition of said component.

It is preferred for each conducting fibre to have an electrically conducting surface. This surface may be an electrically conducting coating provided on the interior of the fibre, where the fibre is hollow. Additionally or alternatively, the electrically conducting surface may be provided on the exposed surface of the fibre. Still further, the or each fibre may be made of electrically conducting material itself. For example, the or each conducting fibre could be surrounded by glass fibres to electrically isolate it from the other conducting fibres. Moreover the fibres may be collected with other like fibres into conducting tows that are electrically isolated from other such tows in the structure.

There are various different ways in which the electrically conducting coating, core or layer may be deposited on or in the fibre. For example, the electrically conducting coating, core or layer may be deposited at least partially in the vapour phase. Alternatively, the electrically conducting coating, core or layer may be deposited by applying molten metal material to the fibre and allowing said metal material to solidify to create said electrically conducting layer or coating. Another method is to apply the coating, core or layer by means of electroless plating, by electroplating, or a combination of both. For example a first layer or layers may be deposited by electroless plating with a subsequent layer or layers being deposited by electroplating. This allows greater control of the overall plating process.

The coating, core or layer may be selected from any suitable conducting material including amongst which are metals including, but not limited to silver, gold, copper, aluminium, chromium, nickel iron, gallium, indium and tin, and alloys including one or more of the aforesaid, and also conductive polymers, electrolytes and colloids. The fibres may be of any suitable fibre that can be used in the construction of a fibre reinforced composite material including carbon fibres, glass fibres, mineral fibres, ceramic fibres, polymeric fibres, and metal fibres.

The matrix material preferably comprises a suitable material which is electrically insulating. The matrix material may be polymeric, elastomeric, metal, glass, and/or ceramic, or a mixture of these.

The terms "electrically conducting" and "electrically insulating" are relative and intended to be interpreted as meaning that a useful electrical signal is transmitted along a desired signal or power path.

The term "metal" is used to include not only pure metals but metal alloys. Also included are semiconductors and semimetals.

In this way the arrangement can monitor various physical, chemical, electrical or electro-magnetic influences to which the structural component is exposed.

In a preferred arrangement for monitoring the structural component, said component comprises a group of a plurality of spaced electrically conducting fibres extending in a first coordinate direction and a second group of a plurality of electrically conducting fibres extending in a second coordinate direction, and electrical monitoring means for monitoring the first and second groups to determine an electrical characteristic of the respective fibres and to provide an indication of the structural health of the component and to provide an indication of the location of an event that alters the said electrical characteristic of one or more fibres in both groups. In this way the locality of say a crack or impact may be determined. Suitable methods include capacitance, reflectometry, and time domain reflectometry.

Thus the said first and second groups may be generally orthogonally arranged to provide columns and rows of electrically conducting fibres, and said electrical monitoring means may be adapted to detect changes in said electrical characteristic due to an event by reference to the row and column and thereby provide an indication of the location of the event.

It will be appreciated that it is possible to use other methods to determine the location of structural damage or any other observable event, which methods do not require the use of two arrays; thus for example time domain reflectometry may be used to locate the event.

The invention will be better understood by reference to the following description and Examples, reference being made to the accompanying drawings, in which:

FIG. 6 is a schematic view of a composite component with a closed node structural health monitoring system, and FIG. 7 is a schematic view of a composite component with a piezoresistive structural health monitoring system.

In the following examples, a hollow fibre is provided with an internal electrically conducting coating, layer or core so that a fibre composite material can be made which has electrically conducting fibres running through it to provide pathways for signals, power etc. In this way, a fibre composite structure can be provided in which the interface between the external fibre and the matrix material is unaffected, with the electrically conducting region being housed fully within the fibres.

Metallisation Techniques:

CVD

Gas phase metal deposition methods are considered attractive as the viscosity of the coating materials may be many orders of magnitude lower than for liquid phase methods. This greatly simplifies the infiltration of the active materials into very small components as relatively high flow rates may be achieved at modest pressures. A potential CVD technique based on the reduction of silver pivalate in either hydrogen or oxygen at elevated temperature (250° C.) is described in [Abourida M, Guillon H, Jimenez C, Decams J M, Valet 0, Doppelt P, Weiss F, "Process for the deposition by Process for the deposition by CVD of a silver film on a substrate", United States Patent 20070148345].

Liquid Metals

Direct infiltration with liquid metal provides a simple and straightforward approach to creating a metal cored fibre. It is desirable to use a metal with a conveniently low melting point so that both fibres and composites could be treated without risk of damage Electroless Plating A suitable plating technique uses the reduction of a chloroauric acid solution ($HAuCl_4$) by glycerol as described by Takeyasu et al. [Takeyasu N, Tanaka T and Kawata S, "Metal deposition into deep microstructure by electroless plating", *Japanese Journal of Applied Physics,* 44, NO. 35, 2005, pp. 1134-1137.].

The plating process described used the following components:

Plating solution=0.024M $HAuCl_4$+0.75M NaOH+0.086M NaCl in DI water

Reduction agent=0.5% vol. glycerol in DI water

Sensitizer=26 mM $SnCl_2$+70 mM trifluoroacetic acid (TFA) in DI water

EXAMPLE 1

Figure 1:
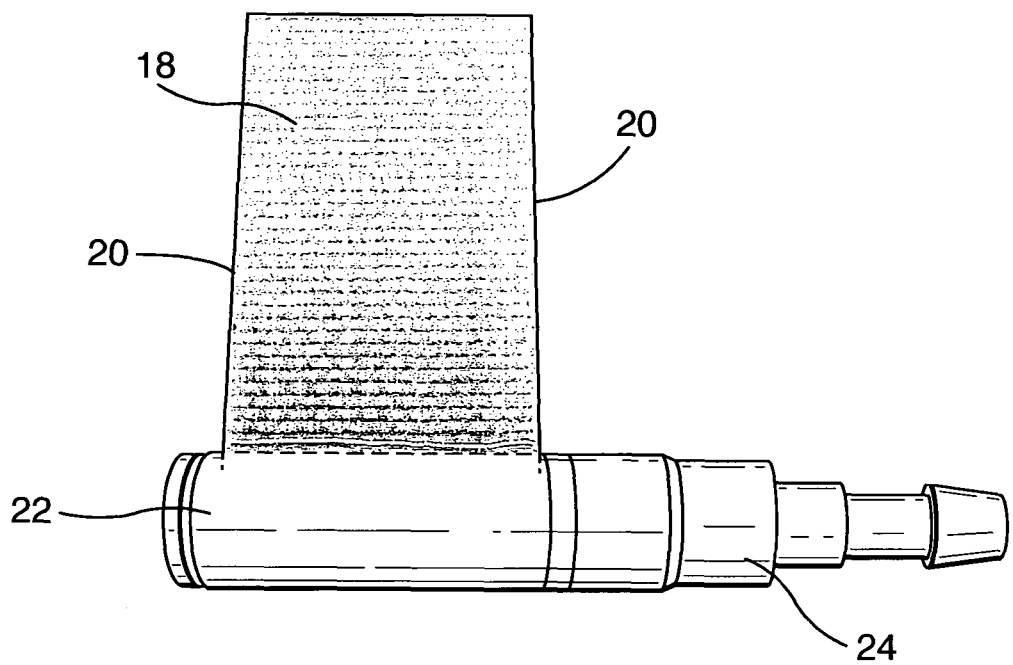
FIG. 1 is a schematic view of an arrangement for infiltrating a composite coupon.

Referring to FIG. 1, short composite coupons 18 of dimensions 30-40 mm long×10-15 mm wide×2-3 mm thick were prepared so that infiltration of full scale fibres could be investigated. The composite was made using a 0°/90° woven fabric and so the long edges 20 of the coupons were sealed to prevent ingress of materials into fibres running in the 90° direction. A polycarbonate reservoir 22 and a pressure fitting 24 were bonded over one of the open ends of the coupon to facilitate the introduction or removal of materials. This configuration allowed materials to be introduced by capillary action or through the use of positive and negative pressure differentials as with the single fibre test specimens.

The composite test specimen was used to investigate the plating behaviour of the gold solution at full-scale The reservoir was filled with sensitizer and this was blown through using dry nitrogen at 2.5 bar until the open end of the specimen was seen to be wet. Typical filling times at 2.5 bar were of the order 5-10 seconds for a 40 mm long panel. The excess sensitizer was removed from the reservoir by pipette and replaced with DI water which was then blown through until the reservoir was empty. The rinsing process was repeated a second time in an attempt to ensure that any excess sensitizer had been removed. Blowing was continued until bubbles could be seen on the open edge of the panel indicating that most of the remaining fluid had been expelled. Freshly prepared 6× gold/ethylene glycol solution was introduced into the reservoir and blowing was started using 2.5 bar dry nitrogen as before. The reaction was seen to start immediately in the reservoir as the walls turned black in a few seconds. It was thought that this was possibly due to the presence of excess sensitizer as it is difficult to rinse the reservoir thoroughly due to its small size and narrow induction port. Blowing was continued for several minutes and the panel was observed to take on a pink appearance within a short time. After approximately 5 minutes, blowing was discontinued and the reservoir was vented to remove the pressure differential. The reservoir was still filled with excess plating solution as was the composite panel and the specimen was left in this condition for 2 hours to allow any remaining metal to plate out. During this time the pink colouring became progressively stronger. This discoloration was taken as an indication that gold was plating out onto the fibres as thin gold films observed on the pipettes also showed a pink/purple coloration before taking on a metallic appearance.

EXAMPLE 2

A second test was conducted to investigate a potential method of avoiding contamination of the reservoir by sensitizer. Previous observations have shown that it takes approximately 8 minutes to infiltrate a 100 mm long panel. Sensitizer was introduced from the open end of the composite panel by dipping and 10 minutes was allowed for infiltration. Contamination of the reservoir was avoided as infiltration by capillary action would automatically stop at the far end of the panel inside the reservoir. After filling, the sensitizer was blown out using 2.5 bar nitrogen as before. The reservoir was then filled with DI water and blown through to rinse out the panel. Two rinses were performed as before. The reservoir was filled with plating solution and blown through for ~4 mins. The panel began to discolour from the open end almost immediately with the purple colour progressing to the other end of the panel over ~5 minutes. No discolouration was observed in the residual fluid in the reservoir for the first ~20-30 minutes after filling after which it proceeded to darken at a rate similar to that observed for the pipettes. The panel was left full of plating solution overnight to finish plating. The composite panel was considerably darker than after the first attempt and the reservoir was almost completely free of discolouration and plating suggesting that the revised filling technique had been successful and that the majority of the potential metal had been deposited onto the fibres.

The depleted plating solution was blown out and replaced with fresh solution. The panel was infiltrated and left again for several hours during which the discolouration became progressively darker with the fibres finally appearing black. Close inspection of the open ends of the panel revealed them to be black but with a slight metallic sheen in places suggesting that these had also been coated. A digital volt meter (DVM) was placed across the ends of the panel and a high, but measurable, resistance was registered suggesting that a continuous connection had been formed.

EXAMPLES 3, 4 AND 5

Three concept demonstrators were fabricated to explore the potential uses of the material. These demonstrators used Ni coated carbon fibres as representative conductive structures as their diameters are of the same order as the glass fibres used in the actual system. The first panel (Example 3) demonstrated the ability to incorporate multiple parallel connections and was used to explore potential connection methods and for electrical tests. Conductive pins were added to the panel by drilling small holes normal to the surface directly over the location of the conductive fibre tows. Gold plated solder pins were push fitted into the holes to form electrical contacts. Several of the pins were also bonded into the panel using a silver loaded conductive epoxy resin for added robustness.

A second panel (Example 4) was configured to give three parallel electrical connections. These were accessible via embedded connectors on the panel ends. The panel demonstrated the material's ability to carry power using a 9V battery and a LED. A bi-colour (red/green) LED was used to demonstrate the ability to carry multiple power rails.

The second demonstrator was also used to investigate the feasibility of transferring data via the material. The three conductors allowed the panel to be configured to carry RS232 compatible serial data streams in both directions. Text and data files were transferred between two laptop computers at rates up to 56 kbit/s.

Figure 2:
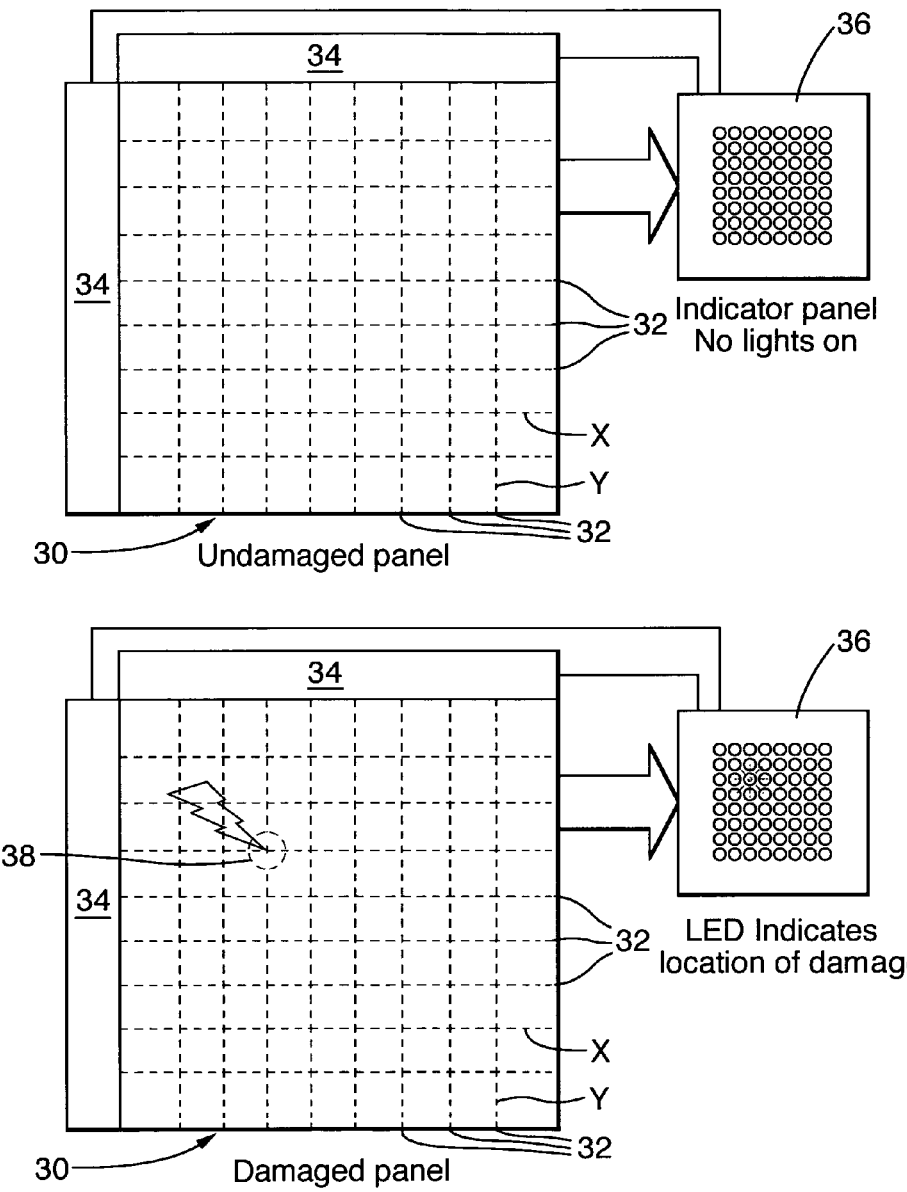
FIG. 2 is a schematic view of an arrangement designed to allow detection and location of structural damage.

Referring to FIG. 2, the third demonstrator (Example 5) consisted of a panel 30 approximately 150 mm square containing an 8×8 array of parallel conductors 32 running in the X and Y planes. The conductors were spaced approximately 10 mm apart and an in-plane insulating layer was formed between the X and Y conductors from several layers of woven glass fibre matting.

The signal transmission properties of the conductors were tested by injecting a sine wave signal at one end and monitoring the far end for signs of attenuation or degradation. The test setup used two adjacent tracks on the X plane as signal conductor and return lines and the output was measured across a 56Ω load.

EXAMPLE 6

, A further demonstration of the potential uses of the material the 8×8 X-Y array of FIG. 2 was configured as a basic damage detection/indication system. A simple electronic circuit 34 was added to allow the location of damage to be indicated on an 8×8 array 36 of LEDs. With the panel in its undamaged state no LEDs were illuminated. An 8 mm hole 38 was drilled through the intersection of a pair of XY fibres which caused the appropriate LED to light up on the indicator panel. This test showed the potential of the system to detect damage over a large area of a component without the need for discrete embedded sensors.

Figure 3A:
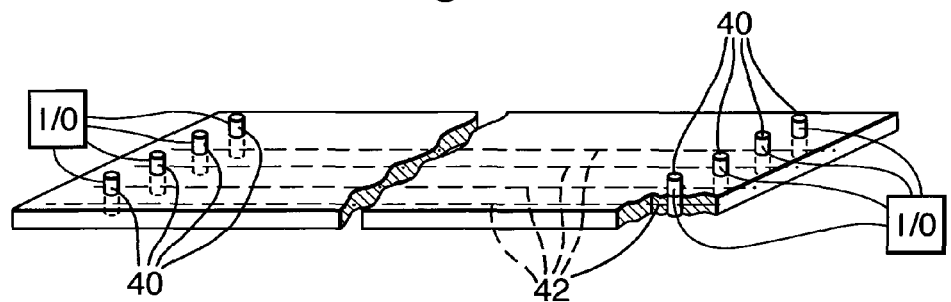
FIGS. 3a to 3c are detailed views of various coupling configurations for use in embodiments of the invention, using ohmic, and contactless capacitive and inductive coupling respectively.
Figure 3B:
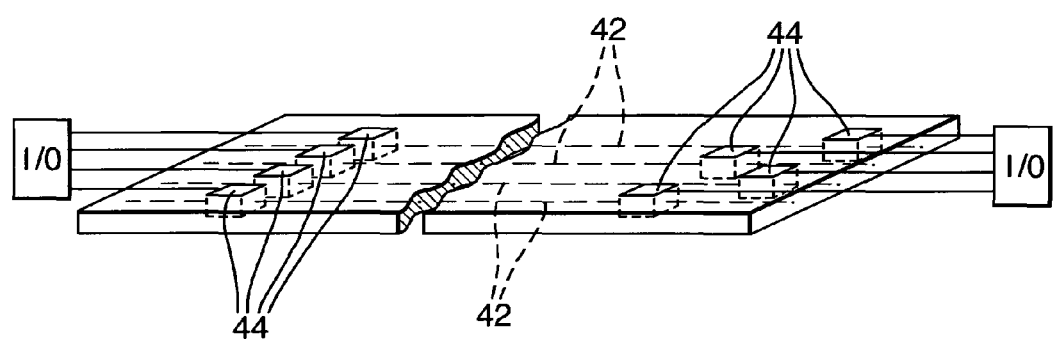
Figure 3C:
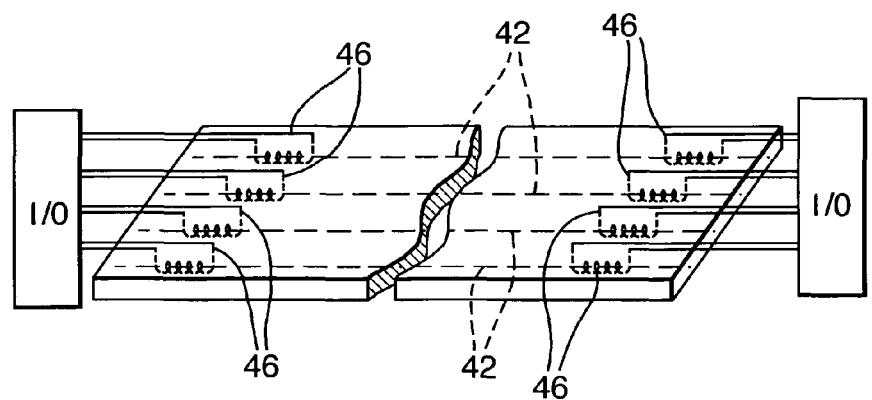

There are a number of different ways in which the conducting elements may be electrically coupled to other circuitry or components. For example as shown in FIG. 3a the coupling may be ohmic, for example by providing terminals 40 that are in direct physical contact with the conducting fibres 42 and which extend out of the composite. Alternatively, as shown in FIGS. 3b and 3c the coupling may be contactless, by means of a capacitative or inductive coupling elements 44 or 46. An advantage of such an arrangement is that the coupling elements may be re-sited as necessary to reconfigure the electrical circuit if, for example, the original conducting fibre is damaged. The coupling elements could take the form of adhesive pads that can be bonded to the composite material permanently or semi-permanently to provide the required electrical coupling with the underlying conducting fibres.

Figure 4:
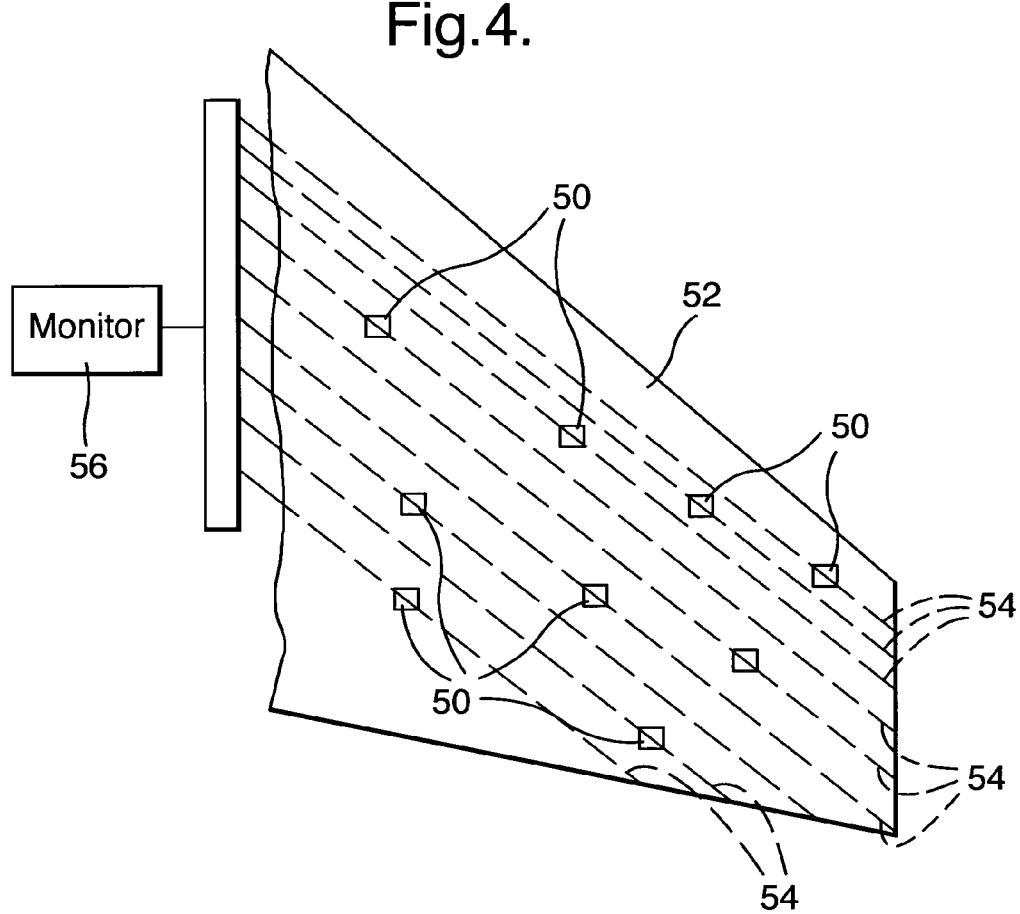
FIG. 4 is a schematic view of the use of an arrangement of this invention for monitoring sensors over an extended surface area of an aircraft.

The circuit so formed may be used to transmit and analogue or digital data signals together, in some instances, with power. For example the data signal may be modulated onto a carrier, and the carrier may be rectified to provide a power source. The circuits so formed may be used for numerous purposes other than conventional power supply or data transfer. Thus for example, as shown in FIG. 4, in aerodynamic studies or aerodynamic control, an array of surface sensors 50 may be provided on an exposed surface of a composite element 52 on an aircraft to detect one or more parameters relating to the structure and/or aerodynamic environment and connected to monitoring equipment 56 by the electrically conducting fibres 54 within the composite element. The use of inductive or capacitive coupling between the sensors 50 and the electrically conducting fibres 52 allows easy reconfiguration and setup.

The provision of an array of conductors on the composite allows redundancy to be built in so that a circuit can be rerouted if required. The conductors could be used to heat the composite material and thus provide de-icing, or to allow the infrared signature of a body to be modified.

Figure 5:
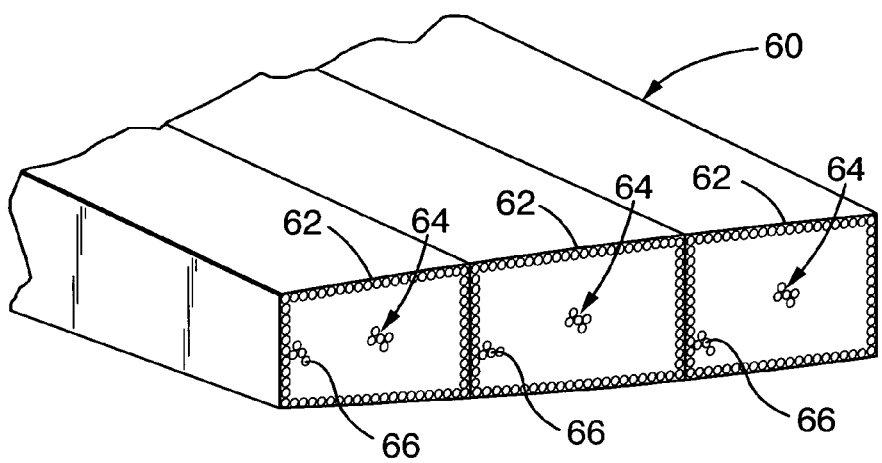
FIG. 5 is a schematic view of a composite structure in which a central core conductor is surrounded by a layer of screening fibres spaced from the core by intermediate fibres to allow the transmission characteristics to be varied.

As shown in FIG. 5, it is also envisaged that, e.g. for transmission or treatment of high-frequency electrical signals, a composite structure 60 could be designed to allow the electrical characteristics along the signal path to be modified. Thus in cross-section there may be a carbon fibre outer screening or ground conductor skin 62 and a central core conductor 64, with the volume between the central core conductor and the screening filled with fibres 66. These intermediate fibres 66 may be solid or hollow or a mixture of both. Where some of the fibres are hollow, the impedance or capacitance of the conductor may be modified by introducing or withdrawing a suitable fluid material into or from said hollow fibres via a manifold system (not shown).

It will be appreciated that the apparatus and methods described herein may be used with other techniques in which a composite fibre structure is configured to perform functions other than purely structural. For example the apparatus and methods herein may be combined with other techniques to make up intelligent structures capable of e.g. shielding and detection of radiation and/or structures capable with a facility the structural health monitoring and/or self repair.

In the arrangement illustrated in FIG. 2 and described in Example 6, the conductors (otherwise referred to as conducting paths) are formed of tows of conducting fibres extending in X and Y co-ordinate directions but without contact at the crossing points as the X and Y paths are insulated from each other. This is referred to herein as an open node grid or network. It will of course be appreciated that other co-ordinate systems may be used, such as e.g. a polar system, and the paths may be non-linear and designed to concentrate in regions of particular interest e.g. to increase the resolution of the grid in these areas, or to align the paths across lines of stress concentration in the structure. Still further for e.g. crack detection the paths may be of zig-zag form. As a further option, the component may be provided with layers of the X-Y open node grid, stacked in the Z direction so that events occurring throughout the thickness of the composite can be detected. For example, delamination or cracking may initiate anywhere in the depth, and so sensitivity or detection capability in the Z direction provides further advantages.

EXAMPLE 7

Closed Node Grid

Referring now to FIG. 6, in this arrangement there are groups of electrically conducting paths as before defined by electrically conducting fibres but in this arrangement the X and Y paths are in electrical contact at their intersecting points in a closed node configuration. The paths therefore in this configuration make up an orthogonal resistance network that is addressable in the X and Y directions. The electrical behaviour and analysis of such networks is well known to those skilled in the art.

In the present arrangement, a processor 74 applies a signal to each of the columns 70 in turn and for each column the voltage at each row is detected and stored by the processor. This is repeated for all the columns and so data for the whole network is captured. This may conveniently be done by defining a table 76 corresponding to the rows and columns of the network and storing in each cell of the table data representing the voltage drop between a selected row and column. By then examining these values, and looking for a peak, the location of an event such as a crack or spalling 78 interrupting the network may be determined. For example, the values may be colour coded and displayed as a two- or three-dimensional image on a display 80. In order to allow for changing external factors, the processor may operate to scan or convert data values represented by the tabular form above to obtain a frame of data and then monitor for differences between successive frames. This technique of monitoring for differences may also be applied to the open node grids described above.

In another type of configuration this technique may be used in conjunction with other suitable structural health monitoring techniques such as acoustic, active/passive acoustic detection, conventional strain gauges, optical (Bragg grating type) strain gauges, and time domain reflectometry.

EXAMPLE 8

Referring now to FIGS. 7(a) and 7(b), in this arrangement the piezoresistive property of certain materials is used to measure the stresses and strains to which a component is subjected. In this arrangement carbon reinforced fibres that are an intrinsic element of the composite material define separate conducting paths 82, 84 within an elongate, high aspect ratio (typically more than 20:1). The carbon fibres inherently have a piezoelectric property whereby the resistance increases as the fibre is subjected to positive strain (from applied tensile stress) and decreases as the fibre is subjected to negative strain (from compressive stress). The gauge factor has been measured to be approximately 0.2.

In the arrangement of FIGS. 7(a) and 7(b), one group 82 of conducting fibres is disposed above the neutral bending axis and one below 84. A detector 86 detects the resistance of the paths, and from this determines the stress/strain along each path. The resistances may be compared using a bridge circuit in known fashion. In one arrangement, the changes in resistance of the groups above and below the neutral bending axis are monitored and analysed to determine whether the component is under tension, compression or bending. Thus, if both groups indicate tension, this indicates that the component is under tension, and the same applies for compression. If one group indicates compression and the other tension, this indicates that the component is experiencing bending, with the bending sense being determined by which is in tension.

In other arrangements, not shown, there may be several groups distributed through the thickness of the components and each individually addressable.

As shown in FIGS. 7(a) and 7(b), the component is provided with screening or grounding layers here adjacent the upper and lower surfaces of the components. These layers are electrically conducting and may be formed of conducting fibres. The layers may be connected to each other and used as a common return path by connecting one end of each group of fibres to the adjacent layer. It is important in this instance to ensure that they do not contribute to or mask the piezoresistive effect of the detecting groups. Thus these screening layers may be made up of lay ups of conducting fibres that provide no resistive response when the component is loaded.

In this arrangement, as with the continuity grid structure described above, respective groups of fibres may be disposed in co-ordinate groups e.g. X and Y with the output data being correlated to determine the location of an event. Here it will be appreciated that as the sensing path is responsive to strain rather than continuity of the fibres, the impact of an object in the interstices between the X and Y groups will be picked up as a strain wave travels from the impact point. By continuously monitoring the readings on both groups therefore, the location of an impact can be determined by interpolating the data. As with the previous arrangements, the X and Y data may be displayed as a two-dimensional image with the row data and column data suitably thresholded or colour coded so that the impact point can be deduced. Likewise, the data may be obtained at intervals with the data being compared between frames to identify changes.

The invention claimed is:

1. A structural health monitoring arrangement comprising:
    a component formed of a fibre reinforced composite material including a plurality of electrically conducting continuous fibres defining electrical paths running through said composite material; and
    a detector for monitoring an electrical characteristic of one or more of said paths, to determine a structural condition of said component;
    wherein said paths are arranged in groups in respective coordinate directions; and the electrical paths are not in electrical contact at nodes of said coordinate directions, to provide an open node network.

2. A structural health monitoring arrangement according to claim 1, wherein said electrically conducting fibres are reinforcing fibres.

3. A structural health monitoring arrangement according to claim 1, wherein said groups extend in orthogonal linear directions in a two-dimensional array to allow detection in X and Y dimensions.

4. A structural health monitoring arrangement according to claim 3, wherein said groups are layered for detection in a third Z direction.

5. A structural health monitoring arrangement according to claim 1, wherein said detector is configured for detecting continuity of one or more selected paths and for determining the co-ordinates of an event causing a break in continuity of one or more of said paths.

6. A structural health monitoring arrangement according to claim 1, wherein the electrically conducting fibres are selected to be piezoresistive, whereby a resistance of a given fibre varies in accordance with applied strain.

7. A structural health monitoring arrangement according to claim 6, wherein selected paths are spaced from a neutral bending axis of the component, to allow detection of bending of the component.

8. A structural health monitoring arrangement according to claim 7, comprising:
    two groups of electrically conducting paths spaced one to either side of the neutral bending axis, the detector being configured for a change of resistance of each group and classifying any loading in terms of a tensile load, a compressive load, bending in a first sense or bending in a second, opposite sense.

9. A structural health monitoring arrangement according to claim 1, wherein said component comprising:
    an electrical screening element disposed adjacent at least one external surface of said component.

10. A structural health monitoring arrangement according to claim 2, wherein said paths are arranged in groups in respective co-ordinate directions.

11. A structural health monitoring arrangement, comprising:
    a component formed of a fibre reinforced composite material including a plurality of electrically conducting fibres defining electrical paths running through said composite material;
    a detector for monitoring an electrical characteristic of one or more of said paths, to determine a structural condition of said component,
        wherein the electrically conducting fibres are selected to be piezoresistive, whereby a resistance of a given fibre varies in accordance with applied strain, and
        selected paths are spaced from a neutral bending axis of the component, to allow detection of bending of the component; and
    two groups of electrically conducting paths spaced one to either side of the neutral bending axis, the detector being configured for a change of resistance of each group and classifying any loading in terms of a tensile load, a compressive load, bending in a first sense or bending in a second, opposite sense.

12. A structural health monitoring arrangement according to claim 11, wherein the electrical paths are in electrical contact at nodes of said co-ordinate directions to provide a closed node network.

13. A structural health monitoring arrangement according to claim 5, wherein said detector is configured for monitoring at spaced intervals to collect data pertaining to said paths, and for determining when changes in said data exceed a threshold value at one or more locations.

14. A structural health monitoring arrangement according to claim 2, wherein the electrically conducting fibres are selected to be piezoresistive, whereby a resistance of a given fibre varies in accordance with applied strain.

15. A structural health monitoring arrangement according to claim 11, wherein the electrical paths are not in electrical contact at nodes of said co-ordinate directions, to provide an open node network.

* * * * *